Jan. 5, 1971 F. A. WARREN 3,552,780
CONNECTOR FOR JOINING RECTANGULAR AND CIRCULAR CONDUITS
Filed Oct. 7, 1968

INVENTOR
FREDERICK A. WARREN

BY *Walter M. Rodgers*

ATTORNEY 3,552,780
CONNECTOR FOR JOINING RECTANGULAR
AND CIRCULAR CONDUITS
Frederick A. Warren, Atlanta, Ga., assignor to Benjamin
W. Bradford, Decatur, Ga.
Filed Oct. 7, 1968, Ser. No. 765,453
Int. Cl. F16l 13/12, 3/04
U.S. Cl. 285—176                     7 Claims

ABSTRACT OF THE DISCLOSURE

A connector for adjoining a conduit of rectangular cross section with another conduit of circular cross section is provided at its ends with a portion of rectangular cross section and with another portion of circular cross section which portions are adjoined to form a unitary structure. The junction between the end portions of the connector is formed in such a way that the circular portion is bevelled and arranged in tangential relationship to three interconnecting sides of the portion of rectangular cross section and the fourth side thereof is adjoined to the bevelled end of the circular portion by an arcuate segment. The portion of the connector which is of rectangular cross section is provided at its outer end with a collar portion for receiving the end of a rectangular conduit and a water-tight junction is formed therebetween by means of lead caulking and to which is bonded a ring of alloy formed integrally with the rectangular conduit.

---

Conventional gutter downspouts ordinarily are of rectangular cross section. It is frequently the practice to interconnect the lower end of such a downspout with the enlarged end of a soil or concrete pipe and voids or crevices at the interconnection are filled with cement. Such practice is unsightly and uniform quality and appearance are difficult to achieve by this procedure.

Known connectors are unsightly and frequently function so as to trap air and thus to impede the flow of water therethrough.

According to this invention an attractive connector is provided by which the lower end of the downspout leader of rectangular cross section is interconnected with a circular conduit in such manner that smooth efficient and easy flow through the connector is achieved whereby turbulance and the attendant impediment to flow is avoided. Toward this end, the diameter of the circular portion of the connector which adjoins the circular pipe is equivalent to the width of the wide sides of the downspout of rectangular cross sectional configuration. The circular portion of the connector is arranged in tangential relationship to three interconnected sides of the portion of the connector which is of rectangular cross section, the side of greater width being interposed between the other two sides. In order to interconnect the circular portion of the connector with the portion of rectangular cross section in an efficient manner, the circular portion is of bevelled configuration and a segment of arcuate configuration is interposed and interconnects the fourth side of the portion of the connector which is of rectangular configuration with the remaining portion of the connector which is of circular configuration.

Figure 1:
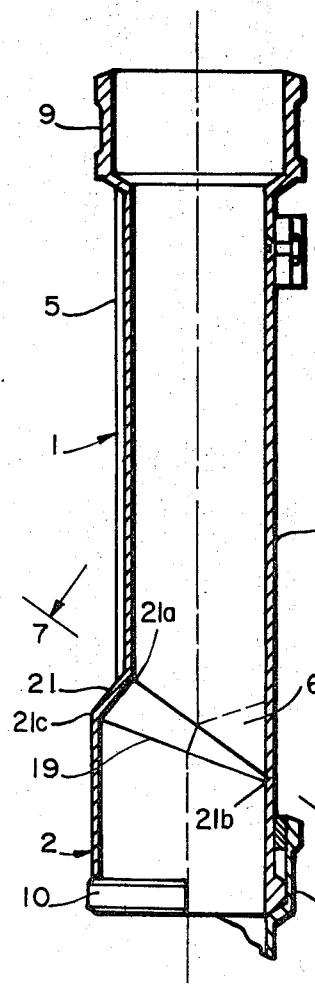
Figure 2:
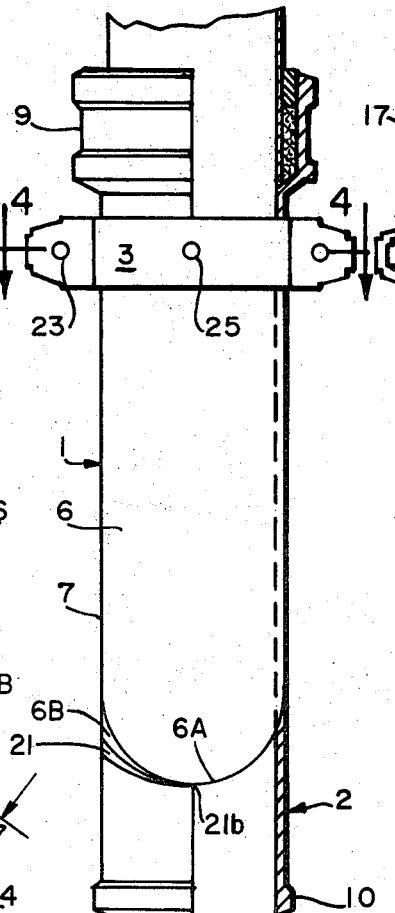
Figure 3:
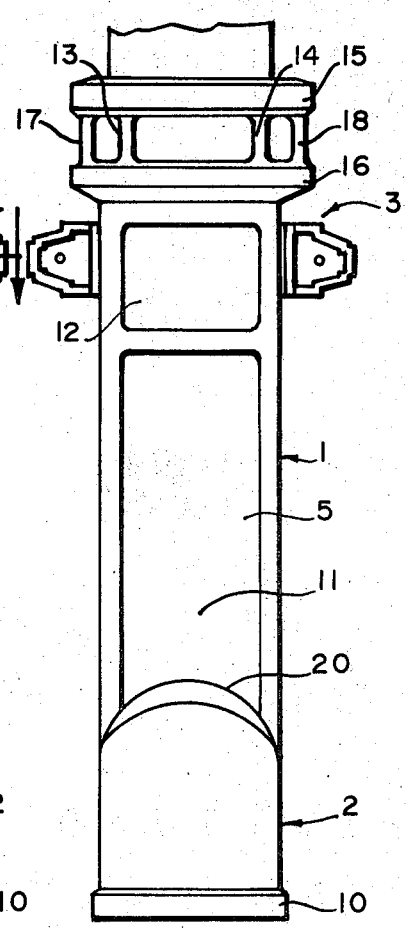
Figure 5:
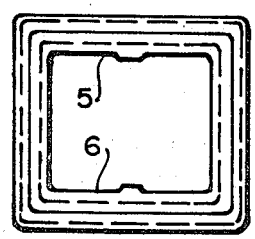
Figure 4:
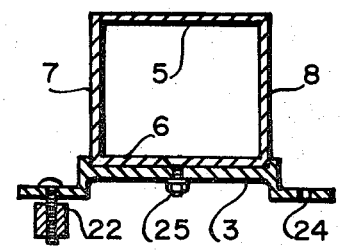
Figure 6:
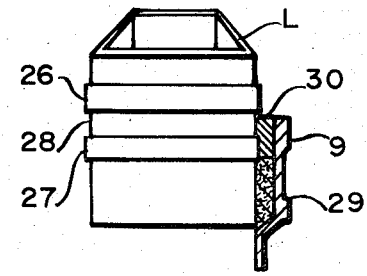
Figure 7:
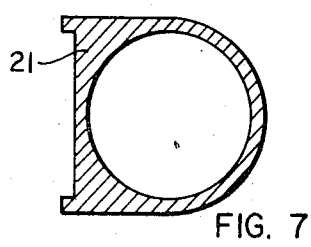
Figure 8:
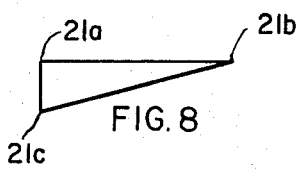

For a better understanding of the invention reference may be had to the following detailed description taken in conjunction with the accompanying drawing in which FIG. 1 is a cross sectional view taken from one side of the connector; FIG. 2 is a view from the building side of the connector and is partially cutaway at its ends; FIG. 3 is a front view of the connector; FIG. 4 is a cross sectional view of the connector taken along the line designated 4—4 in FIG. 2; FIG. 5 is a top view of the connector as viewed for example in FIG. 2; FIG. 6 is a perspective view partially in cross section of the upper end of the connector and of the lower end of a downspout leader adjoined thereto; FIG. 7 is a cross sectional view taken on line 7—7 in FIG. 1 and in which FIG. 8 is a front view of FIG. 7 with part 2 omitted, i.e., a side view with reference to FIG. 1.

In the drawing, the numeral 1 generally designates the upper portion of the connector which is of rectangular configuration while the numeral 2 generally designates the portion of the connector which is of circular configuration. The numeral 3 generally designates a bracket by which the connector is affixed to an associated building and the numeral 4 designates the portion of a circular conduit which is interconnected with the lower end of the connector.

The portion of the connector which is of rectangular cross section comprises a front wall 5, rear wall 6 and side walls 7 and 8. It will be understood that these walls are interconnected along their side edges to form a hollow tubular structure and that the walls 5 and 6 are somewhat wider than the side walls 7 and 8 so that the upper portion of the connector as shown in FIGS. 1, 2 and 3 is rectangular in cross section.

For the purpose of adapting the rectangular portion of the connector for receiving the lower end of the downspout leader which is of rectangular configuration a collar structure generally designated by the numeral 9 is integrally formed at the upper end of the connector.

As has been explained the lower portion of the connector which is generally designated by the numeral 2 is of circular cross section and is provided with an outwardly protruding integral flange 10. Of course flange 10 is inserted within the upper end of a circular pipe which protrudes above ground level a short distance and a portion of which is designated by the numeral 4. Suitable interconnection between circular portion 10 and pipe 4 can be made in known manner as by caulking with lead.

Since one purpose of the invention is to improve the appearance of downspout connectors and to provide an efficient water carrying structure which is in keeping with modern architectural practices, it may be desirable to treat the surface 11 of front wall 5 in a suitable ornamental fashion and to recess this area inwardly somewhat. Similarly the area 12 of front wall 5 is recessed and surface treated in any desired manner so as to enhance the appearance of the connector. Preferably area 12 is provided with a pebble or roughened finish to enhance the appearance thereof, the area 12 being an effective background for lettering or for an ornamental design. Furthermore, upright elements 13 and 14 may be formed in collar portion 9 in a manner to interconnect the flanges 15 and 16 thereof so as to enhance the appearance of the device and the ends of the collar portions between flanges 15 and 16 may be constructed in a manner similar to upright elements 13 and 14 and are designated by the numerals 17 and 18.

In order to interconnect the upper end of circular portion 2 with the lower end of the upper portion 1 which is of rectangular configuration, the end 19 of circular portion 2 is beveled as best shown in FIG. 1. As will be apparent from the drawing generally, the beveled end 19 of circular portion 2 is disposed in tangential relation to the wide rear wall 6 and to the narrow side walls 7 and 8. Since the diameter of circular portion 2 is equivalent to the wide walls 5 and 6, it follows that the front wide wall 5 is not disposed in tangential relationship to the beveled end 19 of circular portion 2 of the connector as is obvious from FIG. 1. Thus in order to interconnect the front wide wall 5 with circular portion 2 it is desirable according to a feature of the invention to form the lower end 20 of the side wall 5 of the connector in a semi-circular configuration as is best shown in FIG. 3. Furthermore, the upper beveled end 19 of the circular portion 2 must be interconnected with the wide side wall 5. Toward this end and in accordance with a feature of the invention, an arcuate segment 21 is interposed between the beveled end 19 of circular portion 2 and the lower edge of side wall 5. Of course the arcuate segment 21 is integrally secured to the lower edge of side wall 5 and the upper beveled end 19 of circular portion 2 as is best shown in FIGS. 1 and 3. The semi-circular lower end 6A of side wall 6 is interconnected with bevelled end 19 of conduit 2 at the adjacent corners of the rectangular portion 1 by corner segments 6b only one of which can be seen in FIG. 2 due to the fact that the lower right hand corner of FIG. 2 is shown in section. Thus the lower circular portion of the connector is of an effectively larger cross section than the upper rectangular portion so that no impediment to the flow of water is afforded.

As is apparent from FIG. 1 the bevelled end 19 of the circular portion 2 of the conduit is disposed at a certain angle to horizontal. This fact results in a geometric figure which is oval shaped when viewed from a vantage point perpendicular to the plane of the line 19. In order to match this oval configuration, the arcuate segment 21 is constructed of a cylinder whose dimension from point 21a to point 21b is equal to the diameter of the circular portion 2 of the conduit. A planar representation of the arcuate segment as viewed from a side of the connector is a triangular figure as shown in FIG. 8. Stated otherwise the transverse dimension of the arcuate segment in a plane parallel to the upper end thereof is equal to the diameter of the circular portion of the connector and the lower edge of the arcuate segment is of oval shape when viewed along an axis normal to said lower edge. Thus the distance from point 21b to point 21c in effect constitutes the hypotenuse of a right triangle having the corners 21a, 21b, 21c. This hypotenuse of course is equal in transverse direction to the large planar dimension of the oval taken along the end 19 of the circular portion 2 of the pipe. Thus the circular arcuate segment 21 is caused according to a feature of this invention to match perfectly with the beveled end 19 of the round portion of the pipe. When viewed from the back of the conduit as shown in FIG. 2, the lower end of the rectangular portion of the conduit is sem-circular in configuration as shown by the line designated 6A. As viewed from the back side as shown in FIG. 2, arcuate segments 21 appears as a pair of thin segments extending from the center 21b to opposite sides and corner segments 6B are disposed immediately above arcuate segment 21 in order to interconnect the upper part of arcuate segment 21 with the adjacent semicircular bottom 6A of the rectangular portion of the conduit. Only one corner segment 6B can be seen in FIG. 2 because the right hand lower part of that view is cut away.

For the purpose of securing the connector to the wall of a building, suitable expansion bolts or the like as designated in FIG. 4 by the numeral 22 may be disposed in the openings 23 and 24 formed in bracket 3 and bracket 3 preferably is interconnected with the connector by a nut or bolt designated by the numeral 25. From FIG. 1 it is apparent that wall 6 is straight at its center line from end to end of the connector so that the connector lies flat against the building.

Downspouts ordinarily are of thin walled construction and connectors such as that made according to this invention are of thick walled construction. When the downspout is disposed inside the connector, it may happen that conventional packing and caulking procedures will force the downspout to collapse inwardly.

In order to form a water tight connection between a downspout leader such as is designated at FIG. 6 by the letter L with the collar portion 9 of the connector and to avoid collapsing the thin walled downspout, it is desirable to apply a pair of rings of masking tape or the like such as are designated in FIG. 6 by the numerals 26 and 27 and to apply a ring of alloy of tin and lead 28 to downspout leader L, the alloy being preferably though not necessarily of equal parts of lead and tin. Thereafter a suitable packing material such as is designated by the numeral 29 may be packed into the collar 9 and subsequently a ring of lead caulking poured into hub such as is designated at 30 will cause fusion of the metals at 30 and 28 in hub or collar 9. Thus, according to a feature of the invention the lead caulking 30 forms a secure water tight bond with the inner surface of the collar 9 and with the alloy ring 28.

The embodiments of the invention in which an exclusive property or privilege is claimed are defined as follows:

1. A connector for adjoining a hollow conduit of rectangular cross section with a hollow conduit of circular cross section, said connector comprising a portion of rectangular cross section having four walls secured at their edges to form a tubular structure and adapted for connection with said conduit of rectangular cross section, a circular portion adapted for connection with said conduit of circular cross section and having a diameter substantially equal to the large cross sectional dimension of said conduit of rectangular cross section, said circular portion having a beveled end portion disposed in tangential relation to three interconnected walls of said portion of rectangular cross section, the central one of said interconnected walls being of a width equivalent to the width of the larger dimension of said portion of rectangular cross section, and a connecting segment of arcuate configuration interposed between and interconnecting the fourth wall and the two narrow walls of said portion of rectangular cross section with said beveled end portion of said circular portion, a planar representation of said segment as viewed from one side of the connector defining a triangular figure one side of which coincides with a planar representation of said beveled end of said circular portion of the connector as viewed from the same side of the conector.

2. A connector according to claim 1 wherein said triangular figure is in the form of a right triangle the hypotenuse of which coincides with said planar representation of said bevelled end of said circular portion of the connector.

3. A connector according to claim 1 wherein corner segments integrally connect said segment of arcuate configuration with said portion of rectangular configuration at the two corners of said three interconnected walls.

4. A connector according to claim 3 wherein the middle one of said three interconnected walls is of convex generally semi-circular configuration at the end thereof adjacent said corner segments.

5. A connector according to claim 1 wherein the transverse dimension of said arcuate segment in a plane parallel to the upper end edge thereof is equal to the diameter of said circular portion of the connector.

6. A connector according to claim 1 wherein the lower edge of said arcuate segment when viewed along an axis normal to said lower edge is of oval configuration.

7. A connector according to claim 1 wherein the lower end of said hollow conduit of rectangular cross section is disposed within said rectangular portion of said connector, said hollow conduit being of thin walled construction relative to the connector, and wherein an alloy of lead and tin is fused to the exterior surface of said end of said hollow conduit of rectangular cross section and wherein lead disposed within the connector hub forms a fused bond with said alloy and a tight fit with said hub.

References Cited

UNITED STATES PATENTS

| | | | |
|---|---|---|---|
| 1,026,607 | 5/1912 | Scherer | 285—176X |
| 1,423,309 | 7/1922 | Curtis | 285—64 |
| 1,771,176 | 7/1930 | Holub | 285—176 |
| 1,977,432 | 10/1934 | Dick | 285—287X |
| 2,094,691 | 10/1937 | Williams | 285—295X |
| 2,397,655 | 4/1946 | Francis | 285—176 |
| 2,506,064 | 5/1950 | Christie | 285—176 |

THOMAS F. CALLAGHAN, Primary Examiner

U.S. Cl. X.R.

285—64, 295